United States Patent [19]

Aharoni

[11] Patent Number: 5,480,944
[45] Date of Patent: Jan. 2, 1996

[54] INTERPENETRATING BLENDS OF LINEAR POLYMERS AND COMPATIBLE FRACTAL POLYMERS

[75] Inventor: Shaul M. Aharoni, Morris Plains, N.J.

[73] Assignee: AlliedSignal Inc., Morris Township, N.J.

[21] Appl. No.: 110,745

[22] Filed: Aug. 23, 1993

[51] Int. Cl.$^6$ ............................................. C08L 77/00
[52] U.S. Cl. ............................................. 525/432; 525/420
[58] Field of Search ............................. 525/432, 420

[56] References Cited

U.S. PATENT DOCUMENTS 4,289,872  9/1981  Denkewalter et al. ............... 528/328

FOREIGN PATENT DOCUMENTS

WO92/08749  5/1992  Germany .
WO93/09162  5/1993  WIPO .

OTHER PUBLICATIONS

"Lyotropic Liquid Crystalline Hyperbranched Aromatic Polyamides", Young H. Kim, J. Am. Chem. Soc., 114, (1992), pp. 4947–4948.

Aharoni. "Gelled Networks Prepared from Rigid Fractal Polymers," Macromolecules, vol. 24, No. 1, Jan. 7, 1991, pp. 235–239.

Aharoni, "Fractal Nature of One–Step Highly Branched Rigid Rodlike Macromolecules and Their Gelled–Network Progenies", Macromolecules, vol. 23, No. 9, Apr. 30, 1990, pp. 2533–2549.

*Control of Surface Functionality in the Synthesis of Dendritic Macromolecules Using the Covergent–Growth Approach*, Macromolecules 1990, 23, 4726–4729.

*Starburst Dendrimers: Molecular–Level Control of Size, Shape, Surface Chemistry, Topology, and Flexibility from Atoms to Macroscopic Matter*, by Donald A. Tomalia, Adel M. Naylor, and William A. Goddard III, Angew. Chem. Int. Ed. Engl. 29(1990) 138–175.

*Fractal Nature of One–Step Highly Branched Rigid Rodlike Macromolecules and Their Gelled–Network Progenies*, by S. M. Aharoni, N. S. MUrthy, K. Zero and S. F. Edwards, 1990 American Chemical Society, pp. 2534–2549.

Primary Examiner—Ana L. Carrillo
Attorney, Agent, or Firm—Michele G. Mangini; Melanie L. Brown

[57] ABSTRACT

This invention relates to polymeric interpenetrating blends comprising a polymer matrix having dispersed therein a branched fractal three dimensional polymer species which comprises rigid aromatic recurring units linked by electrophilic or nucleophilic reactive moieties or derivatives thereof.

18 Claims, No Drawings

INTERPENETRATING BLENDS OF LINEAR POLYMERS AND COMPATIBLE FRACTAL POLYMERS

BACKGROUND OF THE INVENTION

1. Field of the Invention

This invention relates to interpenetrating blends comprising a branched fractal three dimensional polymer (FPs) species which comprises aromatic recurring units having inert or reactive moieties on the exterior thereof having linear polymeric chains passing through and interpenetrated with the fractal polymer (FP). Another aspect of this invention relates to polymeric composites comprising a polymer matrix having dispersed therein the interpeneting polymeric blends of this invention, and to articles of manufacture formed from said blends and polymeric composites.

2. Description of the Prior Art

Aharoni et al. *Macromolecules*, Vol. 23, No. 9, pg. 2533 (1990) describes the preparation of rigid and flexible polymeric networks and their gels by the reaction of aromatic diamine monomers (BB monomers) with aromatic or aliphatic diacid monomers (AA monomers). Aharoni, S. M., *Macromolecules*, Vol. 24, No. 1, pg. 325 (1991), discloses that the formation of crosslinked networks takes place between fractal polymers whose surfaces are decorated by A and B reactive groups in about equal amounts and may take place in the absence of all monomeric or low molecular weight species, by the direct reaction of the fractal polymers under appropriate reaction conditions.

When the fractal polymers are made from AB monomers then their exteriors are decorated by mostly one kind of reactive group, either A or B, and may not react with each other to form crosslinked networks. AB monomers are divalent or polyvalent monomeric species containing either one A group and one or more B groups, or, one B group and one or more A groups.

Conceptually similar structures, called starburst or dendrimer polymers are described in Tomalia, et al, *Angew. Chem. Intern. Ed. Engl.*, 29, 138 (1990), U.S. Pat. No. 4,289,872 and Hawker and Frechet, Macromolecules, 23, 4726 (1990). All these are tedious stepwise reactions which require at each growth step the preparation of protected or unreactable groups on the growing substantially aliphatic, branched species.

BRIEF DESCRIPTION OF THE INVENTION

This invention relates to a blend comprising a polymer having a "non-reactive", "compatible" and "porous" fractal polymer comprising a polymeric matrix comprising one or more linear polymers and a three dimensional or substantially three dimensional branched polymeric species dispersed in said matrix and having said linear polymer interpenetrated therein, said species comprising:

one or more aromatic nuclei of the formula:

$$-(A_1)_a-R_1-(B_1)_b-$$

a branched polymeric moiety bonded to and projecting away from said nuclei having a plurality of branching recurring monomeric units of the formula:

$$-(B_2)_c-R_2-(A_2)_d-$$

which branching recurring monomeric units may be optionally linked by a plurality of linear or substantially linear aromatic polymer segments having one or more recurring extension monomeric units of the formula:

$$-B_3-R_3-A_3-,$$

and a plurality of pendant moieties on the exterior of said polymeric species and bonded thereto which are not reactive with the end groups of the linear polymer, said pendant moieties of the formula:

$$-Z_1$$

when d is greater than c and said pendant moieties of the formula:

$$-Z_2$$

when c is greater than d,
a portion of said branching moieties, said extension moieties or a combination thereof having one or more terminating groups of the formula: $(B_2)_c-R_2-(Z_1)_d$, $-(A_2)_d-R_2-(Z_2)_c$, $-B_3-R_3-Z_1$, $-A_3R_3-Z_2$, or a combination thereof;

wherein:

a and b are different and are integers equal to 0, or equal to or greater than 3, with the proviso that a or b is 0;

$R_1$ is a polyvalent aromatic group such as phenyl, biphenyl, naphthyl or the like or is an aromatic moiety comprising two or more aromatic groups linked together by a linking moiety such as ester, alkylene, urethane or amide linkage;

$R_2$ and $R_3$ are the same or different at each occurrence and are polyvalent aromatic group such as phenyl, naphthyl, biphenyl or the like;

$-Z_2$ is the same or different at each occurrence and is a nucleophilic group such as $-OH$, $-NH_2$, $-N(R)_3^+$, $-C\equiv N$, and $-(O)N(R)_2$ (where R is the same or different and is hydrogen, alkyl, aryl, or aralkyl) which is capable of reaction, such as displacement reaction or the like, with a $-Z_1$ group to form a covalent bond or a derivative thereof;

$-Z_1$ is the same or different at each occurrence and is electrophilic group such as $-C(O)OH$, $-N=C=O$, $-C(O)Cl$, $-(O)OR$, and $C(O)OM$, where M is a monovalent cation such as $NH_4^\oplus Na^\oplus$, $K^\oplus$, $Li^\oplus$, $Cu^\oplus$, $Ni^\oplus$ and the like and R is as described above, which is capable of reaction such as a displacement reaction or the like, with a $-Z_2$ group to form a covalent bond or a derivative thereof;

$A_1$, $A_2$ and $A_3$ are the same or different at each occurrence and are the residue of a nucleophilic group such as $-N(H)-$, $-O-$ and the like formed by a reaction between a nucleophilic group $Z_2$ and an electrophilic group $Z_1$;

$B_1$, $B_2$ and $B_3$ are the same or different at each occurrence and are the residue of an electrophilic group such as $-C(O)-$, $-N(H)C(O)-$ and the like formed by reaction between a nucleophilic group $-Z_2$ and an electrophilic group $-Z_1$; and c and d are different and are integers equal to or greater than 1, with the proviso that the sum of c and d is equal to or greater than 3, and with the further proviso that when a is equal to 0 then d is greater than c and that when b is equal to 0 then c is greater than d.

The blend of this invention exhibits one or more advantages as compared to blends formed from the matrix polymer alone. Such advantages include increased Young modulus, yield strength and glass transition temperatures (Tg). The blend of this invention also exhibits enhanced heat deflection temperatures, and lower than expected solution and melt viscosities which allow for melt processing.

DESCRIPTION OF THE PREFERRED EMBODIMENTS OF THE INVENTION

The blend of this invention contains two essential components, one or more linear matrix polymer having aromatic or substantially aromatic fractal polymers dispersed therein. The fractal polymer must exhibit three essential properties.

The fractal polymer is "non-reactive". As used herein. "non-reactive" means that the fractal polymer in the polymeric matrix polymer is not reactive with the end groups of the linear polymer in the polymeric matrix under preparation conditions. Thus, grafting of the linear polymer onto the fractal polymer via coupling reactions between the exterior moieties (—$Z_1$ or —$Z_2$) and the end groups of the linear matrix polymer do not occur.

The fractal polymers used in this invention also are "porous". As used herein, "porous" means that the fractal polymer is an open structure requiring that the ratio of the volume material in the fractal polymer to the volume of gyration of the fractal polymer is equal to or less than about 0.50, preferably equal to or more than 0.01, more preferably from about 0.40 to about 0.02 and most preferably from about 0.30 to about 0.04. The volume of the fractal polymer may be calculated from relevant atomic volumes and bond lengths reported in the literature. See for example, B. Wunderlich "Macromolecular Physics", Vol. I (Academic Press, N.Y. 1973) pp. 39–68, and A. J. Hopfinger "Conformational Properties of Macromolecules" (Academic Press, N.Y. 1973) pp. 2–24. The volume of gyration can be determined by conventional procedures such as small angle X-ray scattering and light scattering measurements performed on solutions of the fractal polymers in an appropriate solvent as described in greater detail in J. P. Sibilia (Editor) "A Guide to Materials Characterization and Chemical Analysis" (VHC, N.Y. 1988). The volume of gyration may also be calculated by computers using appropriate computer programs, atomic sizes, bond lengths and bond angles.

The porosity of the fractal polymer depends on the average distance between branchpoints in the arms of the fractal polymers. For example, using 3,5-diaminobenzoic acid as the only monomer in the fractal polymer the distance between branchpoints is a moiety of the formula:

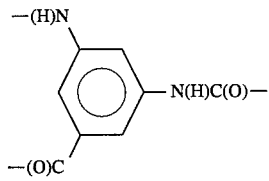

Various fractal polymers based solely on 3,5-diamino benzoic acid having varying fractal polymer volumes, volumes of gyration and ratios of fractal polymer volume to volume of gyration are shown in the following Table 1.

TABLE 1

| Molecular Weight | Material Fractal Polymer (Å)³ | Volume of Gyration (Å)³ | Ratio |
|---|---|---|---|
| 7230 | 6890 | 40619 | 0.17 |
| 13980 | 12399 | 65951 | 0.20 |
| 20730 | 19697 | 88384 | 0.22 |
| 27480 | 26069 | 110655 | 0.24 |

By the using 1:1 aminobenzoic acid to form linking units —B—$R_3$—A— and 3,5-diaminobenzoic acid to form branching moieites —(B)$_c R_2$ —(A)$_d$—. The distance between branchpoints is defined by a species of the formula:

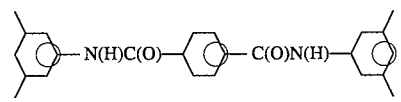

which essentially doubles the distance between branchpoints as compared to the fractal polymers of Table 1 resulting in a structure which more open as shown in Table 2:

TABLE 2

| Molecular Weight | Fractal Polymer Volume, (Å)³ | Volume of Gyration, (Å)³ | Ratio |
|---|---|---|---|
| 6846 | 6618 | 104424 | 0.06 |
| 13212 | 12620 | 172325 | 0.07 |
| 19578 | 18734 | 204205 | 0.09 |
| 25944 | 24857 | 217039 | 0.11 |
| 32214 | 30806 | 249588 | 0.12 |

When the average distance between branchpoints was further increased, by the use of 4:1 p-aminobenzoic acid (forming extension moieties —B—$R_3$—A—) and 3,5-diaminobenzoic acid (forming branching moieties —(B)$_c$—$R_2$—(A)$_d$—), the ratio of fractal polymer volume to volume of gyration decreased dramatically as compared to the fractal polymers of Tables 1 and 2 as shown in the following Table 3:

TABLE 3

| Molecular Weight | Material Volume (Å)³ | Volume of Gyration (Å)³ | Ratio |
|---|---|---|---|
| 6590 | 6314 | 294214 | 0.02 |
| 12732 | 12206 | 626322 | 0.02 |
| 18778 | 17975 | 799052 | 0.02 |
| 24904 | 23835 | 1015028 | 0.02 |
| 31046 | 29721 | 1312612 | 0.02 |

The fractal polymers of Tables 1, 2 and 3 are highly porous, capable of accommodating a relatively large volume fraction of interpenetrated linear polymer, while the dendrimers are very compact the dense, incapable of accommodating interpenetrated linear polymer. This is the fundamental difference between the porous fractal polymers and compact dendrimers.

A dendrimer was constructed from the same monomers used to prepare the fractal polymers of Table 1 above using the procedures described in U.S. Pat. Nos. 4,360,646; 4,507,466; 4,558,120; 4,568,737; 4,587,329; 4,694,064; 4,737,550; 4,857,599 and 5,041,516. In this procedure, monomers are not reacted with each other but only with the previous generation of the growing polymeric species. The dendrimer contained 5 generations. The molecular weight, polymer volume of the dendrimer, volume of gyration of the dendrimer and ratio of the polymer volume and volume of gyration were determined and are set forth in the following Table 4.

TABLE 4

| Molecular Weight | Dendrimer Polymer Volume, (Å)³ | Volume of Gyration, (Å)³ | Ratio |
|---|---|---|---|
| 27970 | 24722 | 32787 | 0.75 |

A comparison of the data in Tables 1, 2 and 3 with the data in Table 4 clearly shows that the porosity of the fractal polymers used in this invention is greater than that of the dendrimer The volume ratio of the dendrimer is 0.75, which is significantly greater than that of the fractal polymers and which is closer to ratio of 1.00 for a fully solid sphere. Because of the large volume ratio, no or substantially no linear polymer chains penetrate within the dendrimer.

In the fractal polymers the volume ratios are rather small, indicating high porosity and an ability to accomodate in the FP a substantial volume fraction of solvent and/or linear polymer chains, provided they are chemically compatible.

For linear chains to penetrate fractal polymers and remain intertwained with them. The linear polymers and fractal polymers must be also compatible having identical or very close solubility parameters. As used herein "compatible" refers to the extent to which the amorphous fractions of the linear polymer and the fractal polymer have a favorable interaction which promotes the intermingling of the linear polymer and fractal polymer in the interphase region. Compatibility derives from one or more of the following criteria: similar cohesive energy densities for the linear polymer and the similar or complimentary capacities for dispersive, polar, or hydrogen bonding interactions, or other specific interactions, such as acid/base or Lewis-acid/Lewis-base interactions.

The compatibility of the fractal polymer and the amorphous fractions of the linear polymer can be determined by dividing the Hildebrand Parameter of the fractal polymer and the amorphous fractions of the linear polymer into separate contributions from dispersion ($\delta_d$), from polar interactions ($\delta_p$), and from hydrogen bonding interactions ($\delta_h$). In this scheme (which is disclosed in "Handbook of Solubility Parameters and Other Cohesive Parameters", by Allan F. M. Barton (CRC Press, 1983) pp. 141–162, 94–110) the Hildebrand Parameter is related to the contribution from dispersion ($\delta_d$), polar interactions ($\delta_p$) and hydrogen bonding ($\delta_n$) ("Hansen Parameters") by the relationship.

$$\delta^2 = \delta^2_d + \delta^2_p + \delta^2_h$$

In general, the solubility parameter of the amorphous fractions of the linear polymer should be within 1.0 (MPa)$^{1/2}$ of the solubility parameter of the fractal polymer. The difference in solubility parameters is preferably 0.7 (MPa)$^{1/2}$ and more preferably 0.5 (MPa)$^{1/2}$. For example, branched fractal aromatic polyamides and nylon-6 are compatible. The solubility parameter of nylon-6 is 22.5 (PMa)$^{1/2}$ (D. W. Van Krevelen, "Properties of Polymers"; Elsevier, Amsterdam, 1990; p. 800). The solubility parameter of branched aromatic polyamides such as those in the fractal polymers of this invention is 23 (MPa)$^{1/2}$. (S. M. Aharoni, J. Appl. Polymer Sci. 45, 813 (1992). The difference in solubility parameters of only 0.5 (MPa)$^{1/2}$, makes the branched aromatic polyamide fractal polymers and the linear nylon-6 substantially compatible and miscible. A good compatibility and molecular-level mixing of the two parent polymers will be reflected in the appearance of a Tg at temperature higher than the Tg of the linear matrix polymer and in the complete or partial disappearance of the original Tg of the linear matrix polymer as determined by the differential scanning calorimetry heating the blend from a temperature of 25° C. to about 300° C. under inert gas at a heating rate of 10° C. per minute.

As an essential component, the fractal polymer of this invention include one or more aromatic nuclei of the formula:

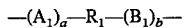

where $A_1$, $R_1$, b, $B_1$ and a are as defined above. The number of aromatic nuclei include in the fractal polymer may vary widely. The number of nuclei is preferably from 1 to about 8, more preferably from 1 to about 4, and most preferably 1 or 2. Those embodiments in which the number of nuclei is 1 are the embodiments of choice.

The nuclei comprises a polyvalent (valency equal to or greater than three) aromatic moiety —$R_1$—. Useful polyvalent —$R_1$— aromatic groups may vary widely and are not critical. Illustrative of useful $R_1$ groups are phenylene, biphenylene, naphthyl, dinaphthyl, diphenyl ether, diphenyl sulfone, phenyl benzoate, 2,2-biphenylene propane, benzanilide and combinations thereof obtained by linking any number of aromatic groups by means of direct ring-ring condensation, inter-ring single covalent bond on such groups as amide, ester, ether, azo, methylene, sulfide, carbonate, sulfone, urethane and the like. Other, small, fractal polymers may also serve as $R_1$ groups for larger fractal polymers. In the most preferred embodiments of this invention, $R_1$ groups are the same or different and are phenylene or naphthylene, or an aromatic moiety formed by two or more phenylene groups connected by amide, ester or urethane linking groups (preferably amide or ester linking groups and more preferably amide linking groups).

The aromatic nucleus also comprises linking moieties of the formulas $A_1$ and $B_1$ which are defined above. Preferred —A— groups are —O— and —N(H)— and preferred —$B_1$— groups are —C(O)O— and —N(H)C(O)—.

As a second essential component, the fractal polymer comprises a plurality of branching monomeric units of the formula:

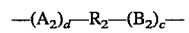

in which A, B, —$R_2$—, c and d are as described above.

—$R_2$— groups may vary widely and are polyvalent aromatic groups, Illustrative of useful —$R_2$— are those of the formula:

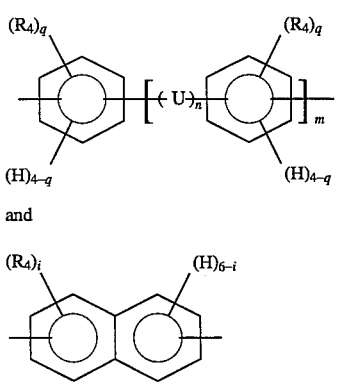

and wherein:

q is an integer from 0 to 4;

i is an integer from 0 to 6;

m is 0 or an integer equal to or greater than 1;

n is 0 or 1;

U is the same or different at each occurrence and is —O—, —S—, —$SO_2$—, —N($R_5$)—, —N($R_5$)C(O)N($R_5$), —N=N—, —N($R_5$), —N($R_5$)C(O)—, —C(O)N($R_5$)—, —S(O)—, —C(O), —C(O)O—, —OC(O)— or —[C($R_5$)($R_6$)]$_p$—;

$R_4$ is the same or different at each occurrence and is alkyl, aryl, alkoxyaryl, alkylaryl, arylalkyl, alkoxy, alkoxyalkyl, nitro, cycloalkenyl, halo, cyano, cycloalkyl or aryloxy; and $R_5$ and $R_6$ are the same or different and are hydrogen, alkyl or aryl.

Preferred —$R_2$ groups are those of the above formula wherein:

$R_4$ is the same or different at each occurrence and is alkyl, alkoxy, aryl, phenoxy or halo (more preferably alkyl); and q, h and i are the same or different and are 0 or 1;

n is 0 or 1;

m is 0 or 1;

p is 1 or 2;

U is —O—, —S($O_2$)—, —N(H)C(O)N(H)—, [—C($R_5R_6$)—]$_p$, —C(O)—, —N($R_5$)—, —C(O)O— or —N(H)C(O)—, more preferably —N(H)— and —[—C($R_5R_6$)—]—; and $R_5$ and $R_6$ are the same or different at each occurrence and are hydrogen or alkyl of from 1 to 4 carbon atoms, more preferably $R_5$ is hydrogen and $R_6$ is hydrogen or methyl.

—$A_2$ and —$B_2$ groups are linking groups as described above. Preferred embodiments of the invention are those where the —$B_2$— group is —C(O) or —N(H)C(O)— and the —$A_2$— group is —O—or —N(H)—

The fractal polymer of this invention may also include one or more interior polymeric segments having one or more extension monomeric groups of the formula:

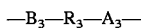
—$B_3$—$R_3$—$A_3$— as an optional component, where —$A_3$—, —$B_3$—, and $R_3$ are as described above. Useful —$A_3$—, —$B_3$—, and $R_3$ groups and the order of preference are as described above for the branching monomeric units of the formula:

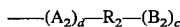
—($A_2$)$_d$—$R_2$—($B_2$)$_c$

The mole % of branching monomer units and extension monomeric units and their relative proportions may vary widely depending on the desired properties. For example, the greater the amount of extension monomeric units, the greater the distance between branching points and the more expanded the fractal polymer particle and the greater the porosity of the fractal polymer. Conversely, the lesser the amount of extension units, the less the distance between branching points and the more compact and less porous the fractal polymer. In general, the mole % of branching monomeric units is from about 100 to about zero and the mole % of extension monomeric units is from 0 to about 95 based on the total moles of branching monomeric units and extension monomeric units. Preferably, the mole % of branching monomeric units is from about 100 to about 33 and the mole % of extension monomeric units is from about 10 to about 75; more preferably mole % of branching monomeric units is from about 75 to about 40 and of extension monomeric units is from about 25 to about 70; and most preferred mole % of branching monomeric units is from about 70 to about 45 and the mole % of extension monomeric units is from about 30 to about 65.

The fractal polymers of this invention will also include various terminating groups in the interior of fractal polymer which may be bonded to the —$B_2$ and/or —$A_2$ moieties of the branching monomeric units and/or the —$B_3$ and/or —$A_3$— moieties of the extension monomeric units. These interior terminating groups result from incomplete reaction of monomers during the preparation of the fractal polymer mainly because of steric hindrance. For example, in the reaction of monomers of the formula ($Z_2$)d—$R_2$—($Z_1$)$_c$ to form branching monomeric units. Incomplete reaction may occur between branching monomeric units, extension monomers or a combination thereof because of an inability of reactive moieties to react resulting in terminating groups of the formula —(A)$_d$—$R_2$($Z_1$)$_c$, —(B)$_c$—$R_2$($Z_2$)$_d$ or a combination thereof bonded to a branching moiety and/or extension moieties. Moreover, the same phenomenon can occur with monomers forming extension moieties which partially react with themselves and with branching monomers to form terminating groups of the formula —A—$R_3$—$Z_1$, —B—$R_3$—$Z_2$ or a combination thereof bonded to branching and/or extension monomeric units. The fact that all of the reactive end groups of the monomers do not react forming interior terminating groups is in part responsible for the enhanced porosity of the fractal polymers as compared to the porosity of dendrimers where all or substantially all reactive moieities of the monomers are reacted such that and the dendrimer does not include interior terminating groups. The amount of interior terminating groups may vary widely, the only requirement is that some groups are present in the fractal polymer. The amount of interior terminating groups is usually at least about 5 mole % based on the total moles of branching monomeric units and extension monomeric units. The amount of the interior terminating group is preferably at least about 6 mole %, more preferably from about 8 to about 30 mole % and most preferably from about 10 to about 35 mole % on the aforementioned basis.

The values of a, b, c and d may vary widely within the stated ranges. The greater the value of a, b, c and d, the heavier the degree of branching and the more rigid the fractal polymer; and conversely, the lower the value of a, b, c or d the less heavily the degree of branching and the less rigid the polymer. In the preferred embodiments of the invention, a and b are different and are 0, or integers from 3 to about 20, with the proviso that one of a or b is 0, and c and d are different and are integers from 1 to about 5 with the proviso that the sum of c and d is from 3 to about 9. In the more preferred embodiments of the invention, a and b are different and are 0 or integers from 3 to about 12, with the proviso that one of a or b is 0, and c and d are different and are integers from 1 to about 5 with the proviso that the sum of c and d is from 3 to about 7. In the most preferred embodiments of the invention, a and b are different and are 0 or integers from 3 to 6 with the proviso that one of a or b is 0, and c and d are the same or different and are integers from 1 to about 4, with the proviso that the sum of c and d is from 3 to about 5.

The fractal polymer of this invention includes at least one electrophilic surface moiety —$Z_1$ or at least one nucleophilic surface moiety of —$Z_2$ which are not reactive with the linear polymer forming the polymeric matrix. Useful —$Z_1$ moieties may very widely and include electrophilic groups such as —C(O)OH, —N=C=O, —C(O)Cl and the like or such groups which have been derivatized by reaction with a derivatizing reagent as for example $R_7OH$ and $R_7NH_2$, where $R_7$ is aryl or alkyl, to form functionalities such as $R_7N(H)C(O)$—, $R_7N(H)C(O)O$—, or $R_7OC(O)$. Preferred —$Z_1$ groups are —C(O)OH, and —N=C=O, and more the preferred —$Z_1$ group are —C(O)OH or derivatized forms thereof such as $R_7N(H)C(O)$— and $R_7OC(O)$— where $R_7$ is as defined above. Useful —$Z_2$ moieties may vary widely and include nucleophilic moieties such as —$NH_2$, —OH, and the like. Preferred —$Z_2$ groups are —$NH_2$, and —OH, and the more preferred —$Z_2$ group is —$NH_2$ or derivatized forms thereof such as $R_7 C(O)N(H)$— and $R_7OC(O)N(H)$— where $R_7$ is as defined above.

The relative values of a, b, c, and d is determinative of whether a —Z, or —$Z_2$ group is on the exterior of the fractal polymer and also controls the degree of branching. The average number of functionalities substituted on the exterior of the fractal polymers is dictated by the ratio of trivalent or higher valent monomers to nuclei in the reaction mixture.

The number of exterior moieties —$Z_1$ or —$Z_2$ included in the fractal polymer of this invention may vary widely, and depends on the relative values of a, b, c and d and the linear polymer forming the matrix. The number of surface reactive groups —$Z_1$ or —$Z_2$ is usually at least about 6. The number of —$Z_1$ or —$Z_2$ groups are preferably from about 6 to about 256, more preferably from about 8 to about 200 and most preferably from about 12 to about 128.

Fractal polymer average particle radius may very widely. In general, the average particle radius is equal to or less than about 50 nanometer (nm). Preferred average particle radius is from about 20 nm to about 1 nm, more preferred average particle radius is from about 10 nm to about 1.5 nm, and most preferred average particle radius is from about 7.5 nm to about 1.5 nm.

The number average molecular weight of the fractal polymer may vary widely. The number average molecular weight is usually at least about 5,000, preferably at least about 10,000, more preferably from about 10,000 to about 300,000, and most preferably from about 20,000 to about 100,000.

The amount of the fractal polymer in the interpenetrating blend may vary widely. It is limited from below by the magnitude of the desired property enhancement, and from above by processing limitations such as temperature, torque and the like. Usually, the amount of the fractal polymer contained in the interpenetrating blend is at least about 0.5% by weight, and may reach up to 50% by weight of the blend. Preferred amounts are from about 2% to about 50% by weight, more preferred amounts are from about 5% to about 30% and most preferred amounts are from about 7% to about 20% by weight of the interpenetrating blend.

The fractal polymer of this invention can be prepared by any suitable method. In the preferred embodiments of this invention, the fractal polymer is formed by reacting one or more nuclei precursor monomers of the formula:

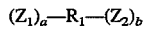

and one or more branching precursor monomer of the formula:

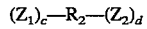

wherein —$Z_1$, —$Z_2$, $R_1$, $R_2$, a, b, c and d are as described above, in an aprotic solvent in the presence of an effective amount of one or more phosphite compounds and an effective amount of a base.

Useful nuclei precursor monomers and branching precursor monomers may vary widely and include those which will provide the desired nuclei and branching monomeric units described above in the same preference. In the preferred embodiments of the invention, useful nuclei precursor monomers and branching precursor monomers are those in which —$Z_1$ is —OH or —$NH_2$ and —$Z_2$ is —C(O)OH or —N=C=O, and more preferred precursor nuclei monomers and branching precursor monomers are those in which —$Z_1$ is —OH or —$NH_2$ (especially —$NH_2$), and —$Z_2$ is —C(O)OH.

The relative amounts of nuclei monomers and branching monomers used may vary widely depending on a number of factors such as the desired number of reactive —$Z_1$, and —$Z_2$ groups at the exterior of the fractal polymers, the desired size of the fractal polymer and the like. The amount of nuclei precursor monomers employed will usually depend on the total amount of branching precursor monomer and will vary from about 0.005 to about 10 mole % based on the total moles of reactive branching precursor monomer employed. The preferred amount of nuclei precursor monomer is preferably from about 0.01 mole % to about 5 mole %, more preferably from about 0.05 mole % to about 3 mole % and most preferably from about 0.1 mole % to about 2 mole % in the aforementioned basis.

The manner in which the various reactive monomers are contacted is such that the branching precursor monomer preferentially reacts with the nuclei precursor monomer at the beginning of the reaction and with the growing fractal polymer and any remaining branching and extension precursor monomers during the course of the reaction. Any procedure capable of accomplishing the foregoing may be employed as for example the Yamazaki Procedure described in more detail in Yamazaki, et al., *J. Polymer Sci. Polymer Chem. Ed.*, 13, 1373 (1975).

The process is carried out in an aprotic solvent having a boiling point equal to or greater than about 115° C. Useful aprotic solvents may vary widely, the only requirements are that they are solvents for the reactants, that they are inert under the reaction conditions and that they have the required boiling point. Illustrative of such solvents are amides such as tetramethylurea, dimethyl formamide, dimethyl thioformamide, N,N-dimethyl acetamide, N-methyl-2-pyrrolidinone, and the like. Preferred aprotic solvents are N,N-dimethylacetamide and N-methyl-2-pyrrolidinone.

Reaction temperatures may vary widely, depending on the boiling point of the reactants and reagents. Usually, the process is carried out at a temperature equal to or less than the boiling point of the solvent. The reaction is preferably carried out at a temperature equal to or less than about 200° C. In the more preferred embodiments of the invention process, temperatures are from about 85° C. to about 150° C., and most preferred process temperatures are from about 100° C. to about 135° C.

The process is carried out in the presence of one or more phosphite ester compounds. Useful phosphite esters compounds include aromatic phosphite esters, and phosphite esters containing more than one phosphite ester moiety linked by a divalent moiety, as for example an oxygen atom or an aliphatic or aromatic moiety. Illustrative of useful phosphite esters are triphenyl phosphite, diphenyl phosphite, tri(nonylphenyl)phosphite, diphenyl isodecyl phosphite, phenyl diisodecyl phosphite, diphenl isooctyl phosphite, phenyl diisodecyl phosphite, poly(dipropylene glycol) phenyl phosphite, poly(4,4-isopropylidene glycol) phenyl phosphite, poly(4,4-isopropylidene diphenol neopentyl alcohol phosphite), bis-(2,4 -di-t-butylphenyl)-pentaerythritol diphosphite, and tris-(2,4-di-tbutylphenyl)phosphite.

An effective amount of one or more phosphite ester compounds is employed. In the preferred embodiments of this invention, the quantity of the one or more phosphite ester compound employed is at least equimolar to the amount of A and B groups to be formed in the polycondensation. The weight percent of phosphite ester compound is more preferably, from about 0.1 to about 10 weight percent is from about 0.2 to about 2 weight percent based on the total weight of the mixture, most preferably.

The reaction is carried out in the presence of an organic base. Useful organic bases may vary widely. Preferred bases are nitrogen bases such as pyridine, imidazole, and various alkylamines such as propylamine, triethylamine and the like, and the most preferred base is pyridine. When the reaction is carried at temperatures higher than the boiling temperatures of the organic bases, these may be kept in solution by continuous reflux.

The base is employed in an amount which is sufficient to promote the reaction to any extent. In general, the amount of base employed is at least equimolar to the amount of branching monomer reactant. In the preferred embodiments of the invention, the amount of base is at least about 2 equivalents of base, based on the total moles of the branching monomer reactant. In the more preferred embodiments of the invention, the amount of base is from about 2 equivalents of base to about 4 equivalents of based on the total moles of the reactant.

As a optional reactant, the reaction mixture may include an extension monomer reactant to control the distance between branchpoints formed from reaction of the branch point monomer reactants and therefore the size of the fractal polymer. Useful extension monomer reactants are of the formulas:

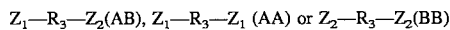

$Z_1$—$R_3$—$Z_2$(AB), $Z_1$—$R_3$—$Z_1$ (AA) or $Z_2$—$R_3$—$Z_2$(BB)

wherein $Z_1$, $Z_2$ and $R_3$ are as described above. In the preferred embodiments of the invention extension monomeric units are formed from monomers of the formulas $Z_1$—$R_3$—$Z_2$ , $Z_1$—$R_3$—$Z_1$ or $Z_2$—$R_3$—$Z_2$. When $Z_1$—$R_3$—$Z_1$ or $Z_2$—$R_3$—$Z_2$ monomers are used, care must be taken that the total $Z_1$ groups in the reaction mixture is not the same as $Z_2$ groups. If their numbers are the same or substantially the same, the growing fractal polymers will tend to aggregate together and form a permanent crosslinked network. The ratio of $Z_1$ to $Z_2$ moieties in the reaction mixture can be controlled through the use of one or both of the branching monomers having exclusively $Z_1$ or exclusively $Z_2$ reactive moieties.

Illustrative of suitable extension monomers are those in which $R_3$, $Z_1$ and $Z_2$ and as described above as for example phenylene, naphthylene and biphenylene, —$Z_1$ is carboxylic acid or isocyanate groups and $Z_2$ is amine or hydroxyl groups. Most preferred extension monomeric groups are aminoaryl acids, arylene diacids and arylenediamines, such as 1,4-benzene dicarboxylic acid, 1,3-benzene dicarboxylic acid, 4'4-biphenyl dicarboxylic acid, 2,6-naphthalene dicarboxylic acid, 1,4-diamino benzene, 1,3-diamino benzene, 4',4-diamino biphenyl, 3',3-diamino biphenyl 2,2-[di-(4',4-diamino benzene)]propane, di-[4',4-diamino benzene]methane, 4-[4-aminophenoxy] aniline and the like.

The amount of extension monomer may vary widely and depends on the desired size, porosity and flexibility of the fractal polymer. In general, the greater the amount of extension monomer added to the reaction mixture, the greater the porosity, size and flexibility of the fractal polymer. Conversely, the lower the amount of extension monomer added to the reaction mixture, the smaller the size, porosity and flexibility of the fractal polymer. The amount of extension monomer actually needed in any situation will be selected to provide fractal polymer of the desired porosity, size and flexibility.

When extension AA and BB monomers of the general structures of $Z_1$—$R_3$—$Z_i$(AA) and $Z_2$—$R_3$—$Z_2$(BB), are used the deviation of the ratio $Z_1/Z_2$ from 1.00 controls the size and porosity of the fractal polymers and the yield of the polymerization reaction therefrom. Therefore, another method to coarsely vary the size of the fractal polymers is by controlling the deviations of the ratio $Z_1/Z_2$ from 1.00.

The extension monomer is preferably added to the reaction mixture in the same manner as the branching precursor monomer, preferably at the same time or substantially at the same time. Here again, the addition is in such a manner that the extension monomer may react with itself to form polymer segments, with the nucleus and with the growing fractal polymer so as to provide segments between the nucleus and branching monomeric units and/or between branching monomeric units. Monofunctional monomers used in terminating the growth of the fractal polymers segments may be added, as a rule after the reaction is progressed.

The process is carried out over a period of time sufficient to produce the desired fractal polymer in an adequate yield. Reaction times are influenced to a significant degree by the reactants, the reaction temperature, the concentration and choice of reactants and reagents, the choice and concentration of reaction solvent, and by other factors known to those skilled in the art. In general, residence times can vary from about a few minutes to 24 hours or longer. In most instances, when employing preferred reaction conditions, residence times will be found to vary from about 30 minutes to about 6 hours.

The fractal polymer product can be isolated from the reaction mixture and purified employing conventional techniques. Illustrative of such techniques are evaporation, precipitation, solvent extraction and recrystallization. The preferred isolation technique is precipitation of the fractal polymer in a non-solvent such as water, alcohol, acetone, etc.

As a second essential ingredient, the interpenetrating blend of this invention comprises a polymeric matrix formed of one or more linear polymers. The particular linear polymer used may vary widely, the only requirement is that the polymer is a thermoplastic polymer, whose end groups are not reactive with the exterior moieites (—$Z_1$ and $Z_2$) of the fractal polymer and has an amorphous fraction having a solubility parameter within about +1.0 (MPa)$^{1/2}$ of the solubility parameter of the fractal polymer dispersed in the matrix polymer and into which the linear matrix polymer has interpenetrated. Useful polymers include thermoplastic polymers such as poly(esters), poly(amides), poly(carbonates), poly(ester carbonates), poly(etherketones), poly(etheretherketones), aromatic poly(oxides), aromatic poly(sulfides) and the like. Preferred thermoplastic polymers are polyesters and copolyesters such as poly(ethylene terephthalate), poly(butylene terephthalate) poly(dimethylene cyclohexylene terephthalate), poly(ethylene terephthalate-co-naphthalate), poly(butane terephthalate-co-naphthalate, and poly(ethylene naphthalate) and polyamides and copolyamides such as the aliphatic or and aliphatic/aromatic copolyamides and polyamides such as poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(nonamethylene azelamide) (nylon 9,9), poly(decamethylene azelamide) (nylon 10,9), poly(4-aminobutyric acid) (nylon 4), poly(6-aminohexanoic acid) (nylon 6), poly(7-aminoheptanoic acid) (nylon 7), poly(8-aminooctanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), caprolactam/hexamethylene adipamide copolymer (nylon 6/6,6), hexamethyene adipamide/caprolactam copolymer (nylon 6,6/6, trimethylene adipamide/hexamethylene azelaiamide copolymer (nylon trimethyl 6,2/6,2), hexamethylene adipamide/hexamethyleneazelaiamide/capryllactam copolymer (nylon 6,6/6,9/6), poly(trimethyl hexamethylene terephthalamide), poly(m-xylelene adipamide), poly(p-xylylene adipamide), poly(hexamethylene terephthamide), poly(dodecamethylene terephthalamide), poly(iminomethylene-1,3-phenylene iminoadipolylene), and the like. Preferred polyesters are poly(ethylene terephthalate) and poly(ethylene naphthalate), and preferred polyamides are nylon 6, nylon 6,6 and nylon 6/66.

The amount of matrix polymer contained in the interpenetrating blends may vary widely, depending on the uses, but is usually at least about 50 weight percent based on the total weight of the blends. The amount of matrix polymer contained in the interpenetrating blends is preferably from about 50 to about 99% by weight, more preferably from about 70 to about 98% by weight and most preferably about 80 to about 95% by weight based on the total weight of the interpenetrating blends.

The number average molecular weight of the polymer forming the polymeric matrix of the blends may vary widely. In general, the molecular weight of the matrix polymer is sufficiently high such that combination of the fractal polymer and linear polymer can form a solid blend. In the preferred embodiments of the invention the number average molecular weight of the matrix polymer is from about 5,000 to about 100,000 and in the particularly preferred embodiments is from about 10000 to about 80,000. Amongst the particularly preferred embodiments, most preferred are those in which the molecular weight of the matrix polymer is from about 20,000 to about 60,000.

The interpenetrating blend of this invention may include various optional ingredients known for use in polymer blends. Such optional components include fibrillar and non-fibrillar fillers, plasticizers, impact modifiers, colorants, mold release agents, antioxidants, ultraviolet light stabilizers, lubricants, antistatic agents, fire retardants, and the like. The optional components are well known to those of skill in the art and will not be described herein in detail.

The interpenetrating blend of this invention can be obtained by conventionally blending the matrix linear polymer and fractal polymer, and various optional components to the extent necessary to obtain the desired blend. Appropriate blending means, such as melt extrusion, batch melting and the like, are well known in the art and will not be described here in greater detail. See for example, "Extrusion" in the Encyclopedia of Polymer Science of Technology, Vo. 6, p. 571–631; John Wiley & Sons, 1986, incorporated herein by reference. For example, a melt can be formed through use of conventional polymer and additive blending means, in which the linear polymer is heated to a temperature equal to or greater than its melting point and below the degradation temperature of each of the polymers. In a particularly preferred embodiment of this invention, the polymers are heated above the melting point of the matrix linear polymer. The melt is then vigorously stirred until the desired dispersion of the fractal polymers in the matrix polymer is obtained.

In the most preferred embodiment, the various essential and optional components can be granulated, and the granulated compounds mixed dry in a suitable mixer, as for example, a tumbler or a Branbury Mixer, or the like, as uniformly as possible. Thereafter, the composition is heated in an extruder or melt blender until the linear matrix polymer is fully melted. The mixture is maintained at that temperature and vigorously mixed until the desired dispersion of the fractal polymers in the matrix is obtained. The interpentrating blend is thereafter ejected with cooling. The interpenetrating blends can also be prepared by dissolving both polymers in a mutual solvent and then co-precipitating in a non-solvent.

The interpenetrating blend of this invention can be used for conventional purposes. For example, the interpenetrating blend of this invention can be used to form injection molded elements, melt-spun fibers of high modules and tenacity, unoriented or oriented films with high strength, and the like.

The following examples are presented to more particularly illustrate the invention and are not to be construed as limitations thereon.

EXAMPLE I

I. Preparation of AB-fractal Polyamide With Amine Exterior Moieties

In about 500 ml solution of 5% LiCl in N,N-dimethylacetamide (DMAc), there were dissolved 0.01 mol (2.143 g) 3,3'-diaminobenzidine at about 100° C. The 3,3'-diaminobenzidine molecules serves as nuclei for the subsequent growth of fractal polymer. To this solution there were added dropwise from two dropping funnels (1) a 1:1 vol/vol mixture of DMAc and 55 ml triphenylphosphite (TPP) and at a much slower rate, (2) a 1:1 molar mixture of 0.16 mol (21.94 g) 4-aminobenzoic acid and 0.16 mol (24.344 g) 3,5-diaminobenzoic acid in a mixture of about 30 ml pyridine and 400 ml DMAc. The reaction mixture was constantly stirred and maintained at ca. 110° C. The dropwise addition of the two mixtures took about 6 hours, after which the reaction was continued for not less than 3 hours. It was then poured into a very large excess of methanol and after filtration carefully washed in methanol, tap water, boiling water and methanol again. The reaction produced a stiff AB-type fractal polyamide with about 64 amine end groups per molecule. The intrinsic viscosity of the polymer was 0.17 dL/g and light scattering indicated its weight average molecular weight was $M_w$=24,600. Subsequent reaction with 4-iodobenzoic acid, careful purification and I,C,H,N element analysis and mass balance indicated the presence of accessible amine reactive groups in about the expected amount (64 amines per molecule). The product was coded A2105-72A.

II. Preparation of AB-fractal Polyamide with Carboxylic Acid Exterior Moieties In 200 ml DMAc there were dissolved 0.00224 mol (0.47 g) 1,3,5-benzenetricarboxylic acid. To this there were added 0.25 mol pyridine and 0.20 mol TPP dropwise throughout the condensation reaction. After dissolution, a solution in 200 ml DMAc of 0.1 mol (18.12 g) 5-aminoisophthalic acid and 0.1 mol (13.71 g) 4-aminobenzoic acid was added dropwise from a separate dropper to the solution containing the 1,3,5-benzenetricarboxylic acid. The addition took six hours and the reaction was allowed to continue for an extra hour, all at 115° C. After completion, the product was worked up as before. This reaction produced a stiff AB-type fractal polyamide with about 64 carboxylic acid end groups per molecule. The intrinsic viscosity of the polymer was 0.17 dL/g and its $M_w$=14200. Reaction with 4-iodoaniline followed by mass balance and I,C,H,N element analysis confirmed that there exist close to 64 accessible carboxylic acid groups per molecule. The product was coded A2105-78B.

III. AB-Type Fractal Polyamides Prepared

AB-type fractal polyamides having amine and carboxylic exterior moieties and their physical properties are set forth in the following Table 5.

TABLE 5

| | AB-Type Fractal Polyamides Prepared | | | | |
|---|---|---|---|---|---|
| Code | Number of $NH_2$ groups per molecule | Number of carboxyl groups per molecule | $[\eta]$dL/g in $H_2SO_4$ | $M_w$ | $R_H$, Å |
| A2105-78B | — | 64 | 0.17 | 14,200 | 21.9 |
| A2105-69B | — | 12 | 0.13 | 16,000 | 17.3 |
| A2105-72A | 64 | — | 0.17 | 24,600 | 19.6 |
| A2105-72B | 48 | — | 0.17 | 22,400 | 20.0 |
| A2105-74A | 48 | — | 0.18(a) | — | — |
| A2105-69A | 6(b) | — | 0.32 | 46,800 | 32.0 |

(a)In DMAc/5% LiCl
(b)First run of series; some interfractal linking took place.

EXAMPLE II

Alterations Of Reactive Groups On the Exterior of AB-Type Fractal Polyamides

I. Ester terminated AB-fractal polyamides

A 48-amine AB-type fractal polyamide was prepared as described above using trifunctional nuclei (prepared from 0.5 g 1,3,5 -benzenetricarboxylic acid and 1.4 g 1,4-phenylenediamine) and 0.1 mol (15.25 g) 3,5-diaminobenzoic acid and 0.1 mol (13.71 g) 4-aminobenzoic acid. When the reaction was completed, a large excess of mono-methyl-terephthalate was added and the reaction was allowed to continue for 3 additional hours. Work up was as before. NMR analysis indicated that all the free amines were reacted to produce exclusively methyl ester-terminated FPs. From the ratio of methyl to aromatic carbons in the NMR scans, it was found that each polymer molecule is associated with close to 48 ester groups. The product was coded $A_{2105}$-79B.

II. Potassium carboxylate terminated AB-fractal polyamides

The carboxyl-terminated FP $A_{2105}$-78B was dissolved in DMAc at over 80° C. To this solution a slight molar excess of KOH in methanol was added, resulting in gradual precipitation. After workup in methanol and acetone, the dried polymer contained over 16.0% by weight potassium. This product was coded A2105-82G.

III. AB-Type Fractal Polyamides Having Altered Reactive Groups

AB-Type fractal polyamides having altered exterior reactive groups and their physical properties are set forth in the following Table 6.

TABLE 6

| | AB-Type Fractal Polyamides with Altered Reactive Groups | | | | |
|---|---|---|---|---|---|
| Code | Precursor | Number of Reactive End Groups | Starting End Groups | Altered End Groups | Remarks |
| A2105-82G | A2105-78B | 64 | carboxylic acid | K+ carboxylate | (a) |
| A2105-79B | A2105-72B repeat | 48 | amine | methyl ester | (b) |
| A2105-81C | A2105-79B | 48 | methyl ester | 2-hydroxyethyl ester | (c) |

(a) obtained by neutralization with KOH/methanol solution at T > 80° C.
(b) obtained by Yamazaki reaction with monomethyl terephthalate.
$[\eta]$ = 0.12 dL/g, $M_w$ = 14,100 and $R_H$ = 20.3Å
(c) obtained by transesterification with ethylene glycol in presence of $ZnCl_2$ catalyst. Reaction carried at 180° C. in ethylene glycol as reagent/solvent

EXAMPLES III and IV and COMPARATIVE EXAMPLES I and II

Preparation of Fractal Aromatic Polyamides Containing AA and BB monomers

A. General Procedure

In a 2000 ml round bottom flask equipped with a magnetic stirring egg and immersed in a silicone oil bath, there were dissolved with warming the appropriate monomer mixture designed to produce the desired segment length between branchpoints, and the desired branchpoint functionality. The solvent of choice was N,N-dimethylacetamide and the monomer concentration was kept at 5 wt/vol % or lower. Once the monomers dissolved, a slight molar excess pyridine was added. When the solution temperature reached about 100C., a slight molar excess of triphenylphosphite was added. The reaction was then allowed to continue for up to 6 hrs at 100° 115° C. Then the reaction was terminated and the fractal polymers precipitated in large excess of methanol. The fractal polymers were then washed repeatedly in nonsolvents such as hot methanol, acetone and water. The fractal polymers were finally dried under dynamic vacuum at about 135° C. until reaching constant weight.

B. EXAMPLES III AND IV

A monomer mixture containing 5:2:5 aminobenzylcyclohexylamine (ABCHA)/1,3,5-benzenetricarboxylic acid (BTCA)/p-aminobenzoic acid (PABA) was used to prepare a fractal polymer coded A2639-10A. Analysis revealed that the fractal polymer coded A2639-10A had an intrinsic viscosity of 0.28 dL/g, weight average molecular weight (Mw) of 63,000 and hydrodynamic radius of 32 Angstroms.

A monomer mixture containing 5:2:5 4,4'-diaminobenzanilide (DABA)/BTCA/PABA was used to prepare a fractal polyamide polymers coded A2639-10B. The intrinsic viscosity of the fractal polymer was 0.20 dL/g, their Mw was 23,000 and hydrodynamic radius 16 Angstroms.

Both the above polymeric products were highly branched with the segment length between branchpoints being about 7 or fewer aromatic rings. They remained soluble in solution and attained rather high molecular weight.

C. COMPARATIVE EXAMPLES I AND II

In order to increase the segment length between branchpoints, a different ratio of the same monomers as used in EXAMPLES III and IV above was used. Here, 2:2:11 molar ratio of ABCHA/BTCA/PABA (coded A2639-17) and 2:2:11 molar ratio of DABA/BTCA/PABA (coded A2639-21) were employed. All other conditions were kept identical with those of EXAMPLES III and IV. Precipitation of low molecular weight polymeric product started during the polymerization, and the precipitate could not be redissolved in the reaction mixture. The Mw of A2639-17 was measured and found to be only 4300 and the ratio of Mw/Mn was only 2.1. Simple arithmetic shows that this product contains, on the average, only 17 aromatic rings and is of too low degree of polymerization to behave as a fractal polymer. Wideangle x-ray diffraction patterns were obtained from A2639-17 and A2639-21 and revealed that both produce crystalline diffraction patterns very similar to those reported in the literature for linear aromatic polyamides (cf. S. M. Aharoni, *Macromolecules*, 20,2010 (1987)). The obtained products are, then, very low molecular weight close to linear aromatic polyamides. They are unsuitable for the desired purpose of this invention. We conclude, then, that when the average length of stiff aromatic segments is too long, they tend to crystallize during polymerization and precipitate out of solution as a very low molecular weight product. This appears to take place when the average length of the stiff segments between branchpoints surpasses ten para-substituted aromatic rings.

EXAMPLE V

Preparation Of Blends Of Fractal Polymers In Nylon-6

I. General Procedures

1. Solution Blending a) Solutions of fractal polymers in hot N,N-dimethylacetamide (DMAc) and of nylon-6 in hot DMAc containing 3% to 5% dry LiCl were separately prepared. Polymer concentration in each was 5 wt/vol % or higher. The solutions were then mixed in the desired proportions designed to yield the desired amount of fractal polymers in the nylon-6 matrix. In all cases, the fractal polymers were kept as the minor component and the nylon-6 as the major component of the blend. The mixed solutions were stirred hot for several hours and finally poured into methanol where all the polymer blends precipitated out. The blend was filtered and washed carefully to remove all the solvent and LiCl. After drying, specimens were molded, quick quenched and allowed to equilibrate with air humidity. The mechanical and other properties of the specimens were then measured.

2. Melt Blending

Powdered fractal polymers were mixed with coarsely ground nylon-6 in the desired proportion. The mixture was then melt blended in a Haake Rheocord-90 instrument at ca. 250° C. for up to 6 minutes. The discharged blend was rather uniform in appearance and its thermal transitions were very similar to those obtained from solution blended blends of identical compositions.

I. Evaluation

The thermal transitions of the blends were evaluated using standard differential clorimetry by heating the blend from room temperature (i.e. about 25° C.) under intert atmosphere at a heating rate of 20° C. per minute to a temperature of 300° C. in two heating cycles, and collecting data from the second heating cycle. The composition of the test blends and evaluation results are set forth in the following Tables 7 and 8.

TABLE 7

Samples using Nylon-6 (LSL grade) and A2639-10A Fractals. Solution or Melt-Blended.

| Sample Code | Ration N6/Fractals | $T_g$, °C. | $T_m$, °C. | Solution melt |
|---|---|---|---|---|
| A2639-12E | 100/0 | 51.5 | 221.4 | solution |
| A2639-15A | 100/0 | 51.2 | 220.1 | melt |
| A2639-13D | 95/05 | 65.0 | 217.4 | solution |
| A2639-15B | 95/05 | 60.2 | 218/7 | melt |
| A2639-13C | 90/10 | 75.2 | 216.7 | solution |
| A2639-15C | 90/10 | 67.6 | 220.1 | melt |
| A2639-13B | 85/15 | 76.8 | 214.6 | solution |
| A2639-15D | 85/15 | 75.2 | 217.7 | melt |
| A2639-13A | 80/20 | 75.7 | 214.7 | solution |
| A2639-15E | 80/20 | 76.3 | 216.4 | melt |

TABLE 8

Samples using nylon-6 (LSL grade) and A2639-10B Fractals. Solution or Melt-Blended.

| Sample Code | Ration N6/Fractals | $T_g$, °C. | $T_m$, °C. | Solution melt |
|---|---|---|---|---|
| A2639-12E | 100/0 | 51.5 | 221.4 | solution |
| A2639-15A | 100/0 | 51.2 | 220.1 | melt |
| A2639-12D | 95/05 | 65.4 | 218.8 | solution |

TABLE 8-continued

Samples using nylon-6 (LSL grade) and A2639-10B Fractals. Solution or Melt-Blended.

| Sample Code | Ration N6/Fractals | $T_g$, °C. | $T_m$, °C. | Solution melt |
|---|---|---|---|---|
| A2639-14B | 95/05 | 66.1 | 219/6 | melt |
| A2639-12C | 90/10 | 67.8 | 217.7 | solution |
| A2639-14C | 90/10 | 68.9 | 218.1 | melt |
| A2639-12B | 85/15 | 82.9 | 218.4 | solution |
| A2639-14D | 85/15 | 74.9 | 215.0 | melt |
| A2639-12A | 80/20 | 81.9 | 216.4 | solution |
| A2639-14E | 80/20 | 89.9 | 213.2 | melt |

The dramatic increases in $T_g$ with increases in the amount of fractal polymers in the blends indicate that blending on a molecular scale was achieved. It also indicates very intimate interpenetration of nylon chains into the rather open highly branched fractal polymers. It should be noted that the glass transition temperature of the fractal polymers, if it altogether exists, is above their thermal degradation temperature, over 350° C.

COMPARATIVE EXAMPLE III

A blend containing about 35% colloidal silica particles and 65% nylon-6 was prepared by thoroughly mixing their solutions in compatible solvents, thoroughly evaporating all solvents, and finally drying up under vacuum at 90C. to obtain a uniform solid blend. The nylon-6 was dissolved in a 2:1 vol/vol mixture of trifluoroethanol and chloroform. The colloidal silica was "dissolved" (actually suspended) in isopropanol. It is characterized by uniformly dense, essentially spherical particles about 100 Angstroms in diameter. It is supplied by Nissan Chemical Industries, Ltd., of Tokyo, Japan, under the tradename Organosilicasol, Type IPA-ST. The preparation contains about 30% amorphous silica particles dispersed in isopropanol.

The fully dried blend was tested by Differential Scanning Calorimeter (DSC) and the glass transition temperature of the blend was found to be 51.7C., essentially the same as that of pure nylon-6. From the immutability of the glass transition we conclude that nylon chains could not penetrate into the dense silica particles, and their mobility was not affected by the presence of these particles. Chains of nylon-6 must be interpenetrated into the FPs in order for their mobility to be restricted and the glass transition elevated. If the interpenetration does not occur, the $T_g$ is not elevated.

EXAMPLE VI

Blends were prepared containing 87.5% Nylon-6 and 12.5% fracatal polymers of two kinds A72639-10A and A2639-103. Then tensile specimens were molded and quick quenched. After equilibration with atmosphere containing 50% relative humidity, the specimens were tested using an Instron Testing Machine to determine the Youngs modulus, yield strength and the yield elongation using standard ASTM test methods. The results are tabulated below in Table 9.

TABLE 9

Physical Characteristics of Compression-Molded Specimens:

| Sample Code | N-6/Fractals Ratio | Fractal code | $T_g$, °C. | Youngs modulus (psi) | Yield Strength (psi) | Yield El. (%) |
|---|---|---|---|---|---|---|
| A2639-16A | 87.5/12/5 | A2639-10B | 74.8 | 254,900 | 5920 | 4.8 |
| A2539-16B | 87.5/12.5 | A2639-10A | 67.6 | 234,600 | 6020 | 5.3 |
| Nylon-6 | 100/0 | None | 51.5 | 166,100 | 4400 | 6.7 |

The intrinsic viscosities of all the above samples fell in the narrow interval of 1.21–1.16 dL/g. The % crystallinity of all quick-quenched specimens was 15%, identical for the three samples. The melting points of the three samples fell in the interval of 220.7° to 217.0° C., almost identical and within the range of pure nylon-6.

EXAMPLE VII

A series of experiments were carried to determine the effect of fractal polymers on the melt viscosity of a blend of nylon 6 (N-6) and various fractal polymers. Melt viscosities (in Pa.s) were obtained at 260° C. at 10 rad/sec. All the results were obtained in a parallel-plate rheometer. The results are set forth in the following Table 10.

TABLE 10

| Sample code | N-6 Ratio of Fractal | Fractal code | Melt Viscosity (Pa · s) |
|---|---|---|---|
| A2639-12E | 100/0 | None | 161 |
| A2639-13D | 95/05 | A2639-10A | 344 |
| A2639-13C | 90/10 | A2639-10A | 317 |
| A2639-13B | 85/15 | A2639-10A | 435 |
| A2639-13A | 80/20 | A2639-10A | 380 |
| A2639-12D | 95/05 | A2639-10B | 469 |
| A2639-12C | 90/10 | A2639-10B | 432 |
| A2639-12B | 85/15 | A2639-12B | 504 |
| A2639-12A | 80/20 | A2639-10B | 462 |

The results in table 10 indicate that the addition of over 20% fractal polymers to nylon-6 does not prevent its melt processing and that it can be molded, extruded or melt-spun under conditions relatively close to those used for the processing pure nylon-6.

What is claimed is:

1. A blend comprising a polymer matrix comprising one or more linear polyamide polymers and copolymers thereof having dispersed therein a non-reactive compatible porous fractal polymer comprising a three dimensional highly branched polymeric entity, said polymeric entity comprising:

(a) one or two aromatic nuclei of the formula:

$$-(A_1)_a-R_1-(B_1)_b-;$$

(b) a branched polymeric moiety bonded to and projecting away from said nuclei having a plurality of branching recurring monomeric units of the formula:

$$-(A_2)_d-R_2-(B_2)_c-;$$

(c) a plurality of linear linking polymeric segments having one or more recurring extension monomeric units of the formula:

$$-B_3-R_3-A_3-$$

said segments bonded to said branching monomeric units; and (d) a plurality of reactive moieties on the exterior of said branched polymeric moiety and bonded thereto, said exterior moieties of the formula:

$$-Z_1$$

when d is greater than c, and said exterior moieties of the formula:

$$-Z_2$$

when c is greater than d,
wherein:

a and b are different and are integers equal to 0, or between 3 and 6, with the proviso that a or b is 0;

$R_1$ and $R_2$ are the same or different at each occurrence and are selected from the group consisting of phenylene, naphthylene, and an aromatic moiety formed by two phenylene groups optionally connected by a linking group selected from the group consisting of amide, ester, carbonyl, sulfone, sulfide, alkylene from 1 to 10 carbon atoms, ether, and urethane, wherein said phenylene may be unsubstituted or substituted with a moiety selected from the group consisting of alkyl, aryl, alkoxy, aryloxy, and halo;

$R_3$ is selected from the group consisting of $R_1$ and $R_2$ divalent moieties;

$A_1$, $A_2$, and $A_3$ are of the formula —N(H)—;

$B_1$, $B_2$, and $B_3$ are of the formula $$\begin{matrix} O \\ \parallel \\ -C- \end{matrix}$$

$Z_2$ is $R_7C(O)N(H)-$, wherein $R_7$ is selected from the group consisting of phenyl, aryl, and alkyl, and X is a moiety of the formula —$OR_8$ or —$R_8$ wherein $R_8$ is aryl or alkyl; and $Z_1$ is of the formula selected from the group consisting of —(CO)X, and $R_7N(H)C(O)-$, wherein $R_7$ is selected from the group consisting of phenyl, aryl, and alkyl, and X is a moiety of the formula —$OR_8$ or —$R_8$ wherein $R_8$ is aryl or alkyl; and c and d are different and are integers equal to or greater than 1, with the proviso that the sum of c and d is equal to 3 or 4, and with the further proviso that when a is equal to 0 then d is greater than c and that when b is equal to 0 then c is greater than d.

2. A blend according to claim 1 wherein —$R_2$— and —$R_3$— are the same or different and are a polyvalent group of the formula:

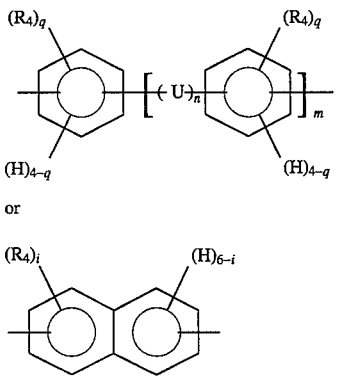

or wherein q is an integer from 0 to 4;

i is an integer from 0 to 6;

m is 0 or 1;

n is 0 or 1;

U is the same or different at each occurrence and is —O—, —S—, —$SO_2$—, $N(R_5)C(O)-$, —$C(O)N(R_5)-$, —C(O)—, —C(O)O—, —OC(O)— or —$(C(R_5)R_6)_p-$;

$R_4$ is the same or different at each occurrence and is alkyl, aryl, alkoxy, halo, or aryloxy;

p is 1 or 2; and $R_5$ and $R_6$ are the same or different and are hydrogen, methyl, or ethyl.

3. A blend according to claim 2 wherein:

$R_4$ is the same or different at each occurrence and is alkyl, alkoxy, aryl, phenoxy or halo; and q, and i are the same or different and are 0 or 1;

n is 0 or 1;

m is 0 or 1;

p is 1 or 2;

U is —O—, —$SO_2$—, —$(C(R_5)(R_6))_p$—, —C(O)—, —C(O)O—, or —N(H)C(O)—; and $R_5$ and $R_6$ are the same or different at each occurrence and is hydrogen or alkyl of from 1 to 4 carbon atoms.

4. A blend according to claim 3 wherein;

U is —O—, $S(O)_2$—, —$(C(R_5)(R_6))_p$— or —C(O)—;

$R_5$ is hydrogen; and $R_6$ is hydrogen or methyl.

5. A blend according to claim 4 wherein —$R_2$— and —$R_3$— are the same or different and are a polyvalent moiety of the formula:

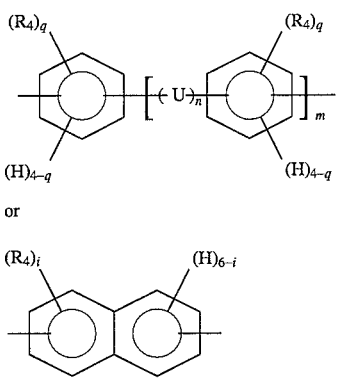

or wherein:

R$_4$ is alkyl;

n is 1 or 0;

m is 1 or 0;

U is (C(R$_5$)(R$_6$))$_p$—; and q is 0 or 1.

6. A blend according to claim 5 wherein m is 0.

7. A blend according to claim 6 wherein q is 0.

8. A blend according to claim 6 wherein m is 1.

9. A blend according to claim 8 wherein q is 0.

10. A blend according to claim 2 wherein

U is —O—, S(O)$_2$—, —C(R$_5$)(R$_6$))$_p$— or —C(O)—; and

R$_5$ and R$_6$ are the same or different and are hydrogen or methyl.

11. A blend according to claim 10 wherein —R$_2$— and —R$_3$— are the same or different and are polyvalent moieties of the formula:

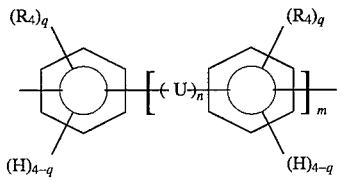

or

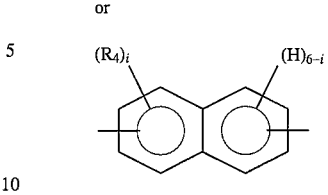

12. A blend according to claim 11 wherein —R$_2$— and —R$_3$— are the same or different and are polyvalent moieties of the formula;

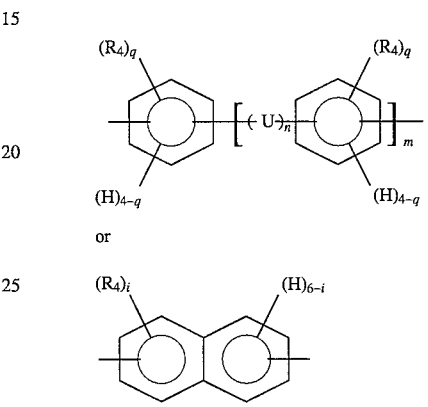

wherein:

R$_4$ is alkyl;

n and m are the same or different and are 1 or 0;

U is (C(R$_5$)(R$_6$)—)$_p$ where R$_5$ and R$_6$ are the same or different and are hydrogen or methyl; and i and q are the same or different and are 0 or 1.

13. A blend according to claim 12 wherein m is 0.

14. A blend according to claim 13 wherein q is 0.

15. A blend according to claim 12 wherein m is 1.

16. A blend according to claim 15 wherein q is 0.

17. A blend according to claim 2 wherein —Z$_1$ is a moiety of the formula: —C(O)X wherein X is a moiety of the formula —OR$_8$ or —R$_8$ wherein R$_8$ is aryl or alkyl.

18. A blend according to claim 1 wherein said linear polyamide polymers and copolymers and terpolymers thereof are selected from the group consisting of aliphatic polyamides and aromatic polyamides.

* * * * *